United States Patent Office.

JAMES D. VAN ARNUM AND WILLIAM IVES, OF TROY, NEW YORK.

Letters Patent No. 98,818, dated January 11, 1870.

IMPROVED NON-CONDUCTING COMPOSITION FOR COVERING STEAM-BOILERS.

The Schedule referred to in these Letters Patent and making part of the same.

We, JAMES D. VAN ARNUM and WILLIAM IVES, of the city of Troy, county of Rensselaer, and State of New York, have invented certain Improvements in Non-Conducting Composition for Coating Steam-Boilers and Pipes, and all other heated surfaces, of which the following is a specification.

Our invention consists of a composition of the following ingredients, viz:
Pulverized coke, six hundred parts.
Pulverized charcoal, five hundred parts.
Sand, six hundred parts.
Flour, two hundred parts.
Goats' hair, ten parts.
Sisal hemp, ten parts.
Cocoa, ten parts.
Boiled linseed-oil, sufficient to form the mass into mortar or paste.

These ingredients, in or about the above-mentioned proportions, are thoroughly incorporated, forming a mortar or paste, which is applied to the heated boiler, pipe, or other surface, by means of a trowel, and allowed to dry.

The paste may be applied to any desired thickness, and when dry, adheres with great tenacity to the surface.

The composition possesses the quality of expanding and contracting in about the same degree as the iron or metal of the pipe or boiler, and is therefore not liable to crack or loosen under the influence of sudden changes of temperature.

What we claim, and desire to secure by Letters Patent, is—

A composition for covering steam-boilers, pipes, and other heated surfaces, consisting of the ingredients herein described, compounded and applied substantially as herein described.

JAMES D. VAN ARNUM.
WILLIAM IVES.

Witnesses:
R. C. JENNINGS,
CHARLES L. STICKNEY.